Sept. 27, 1960 C W. MUSSER 2,954,205
STRAIN WAVE AXIAL VALVE
Filed May 31, 1957 8 Sheets-Sheet 1
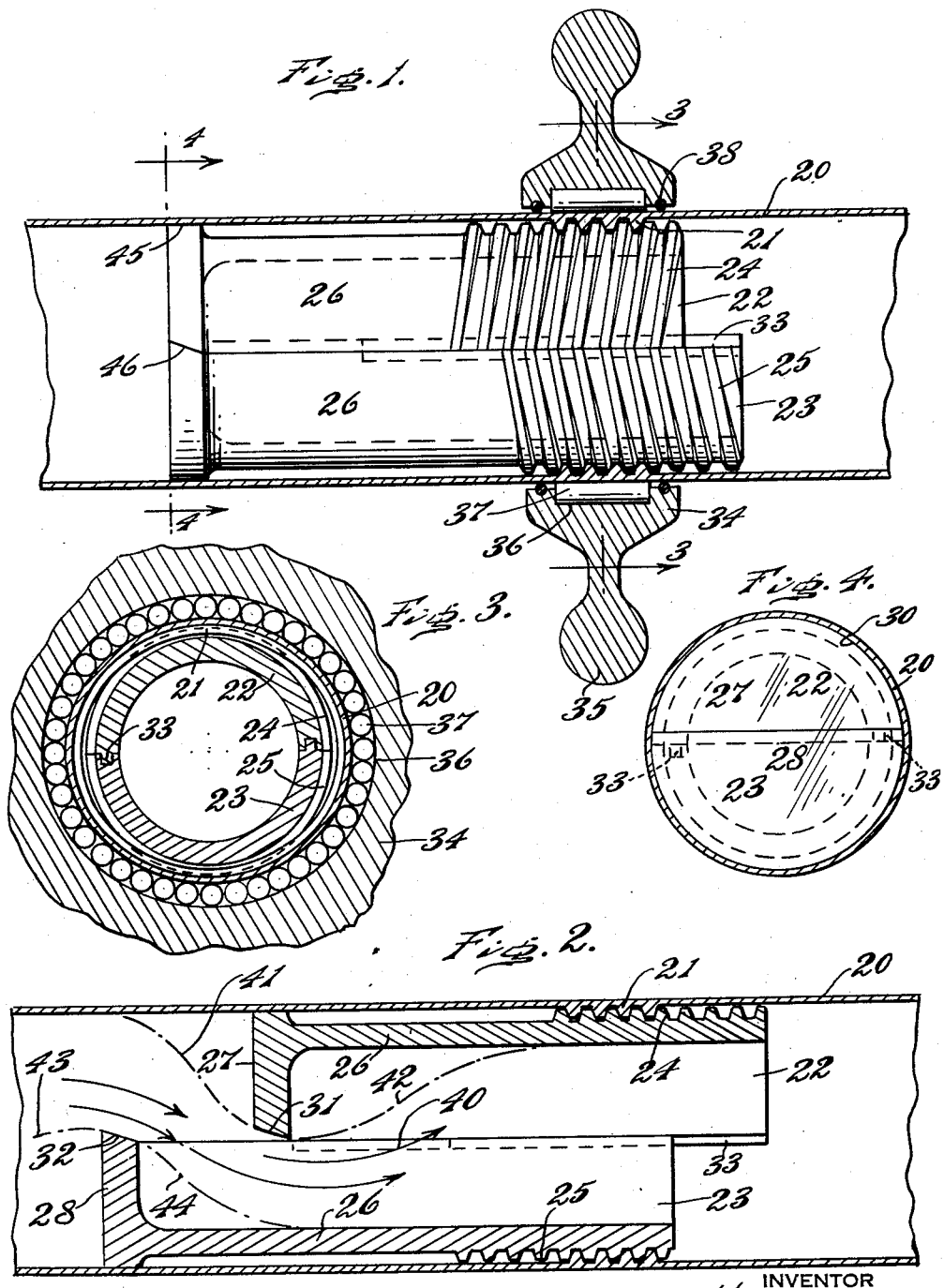
INVENTOR
C. Walton Musser
BY
ATTORNEYS.

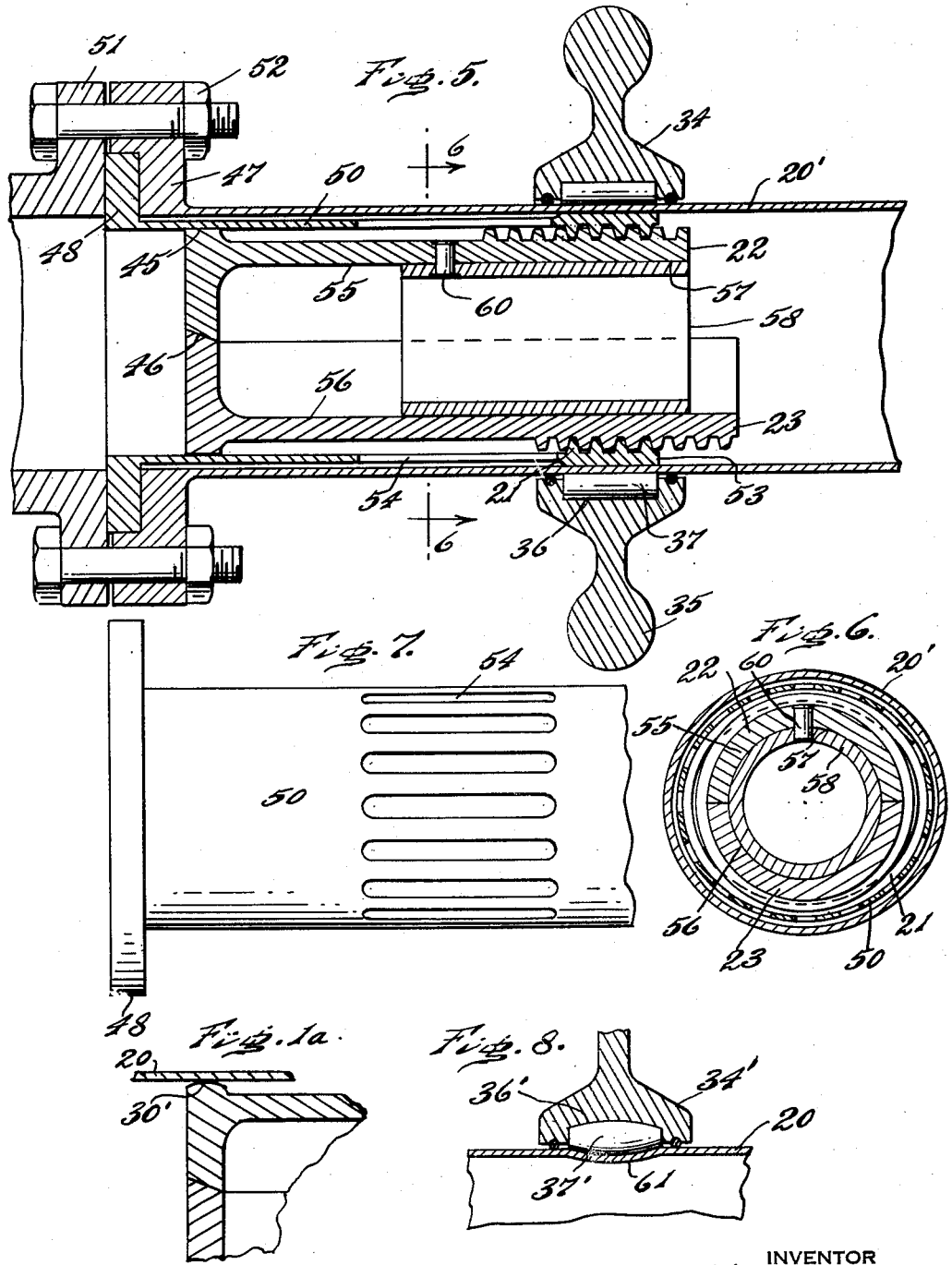

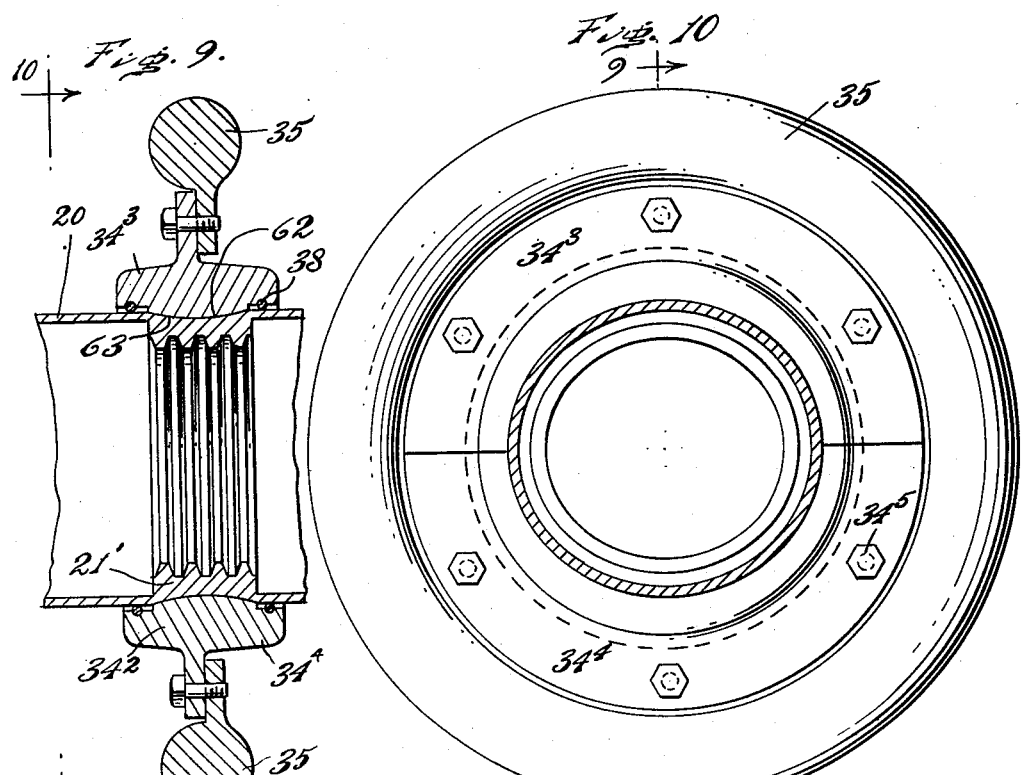
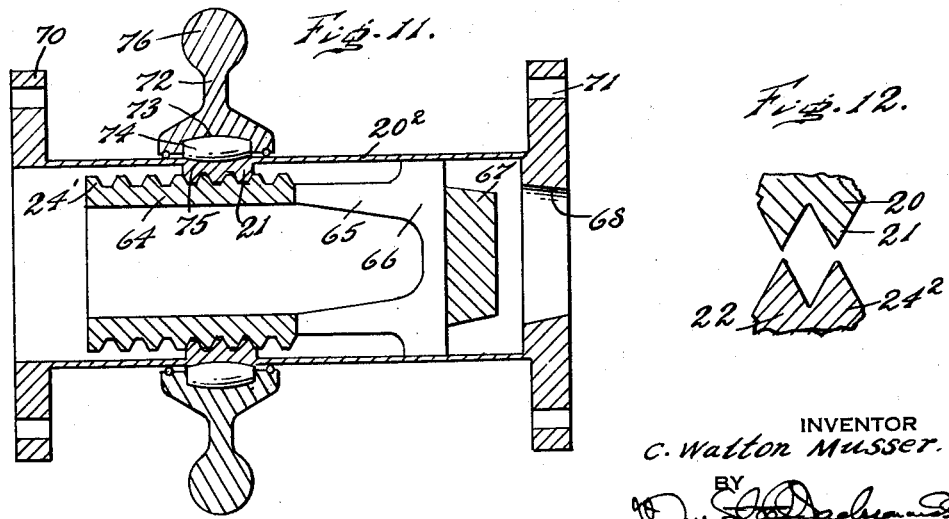

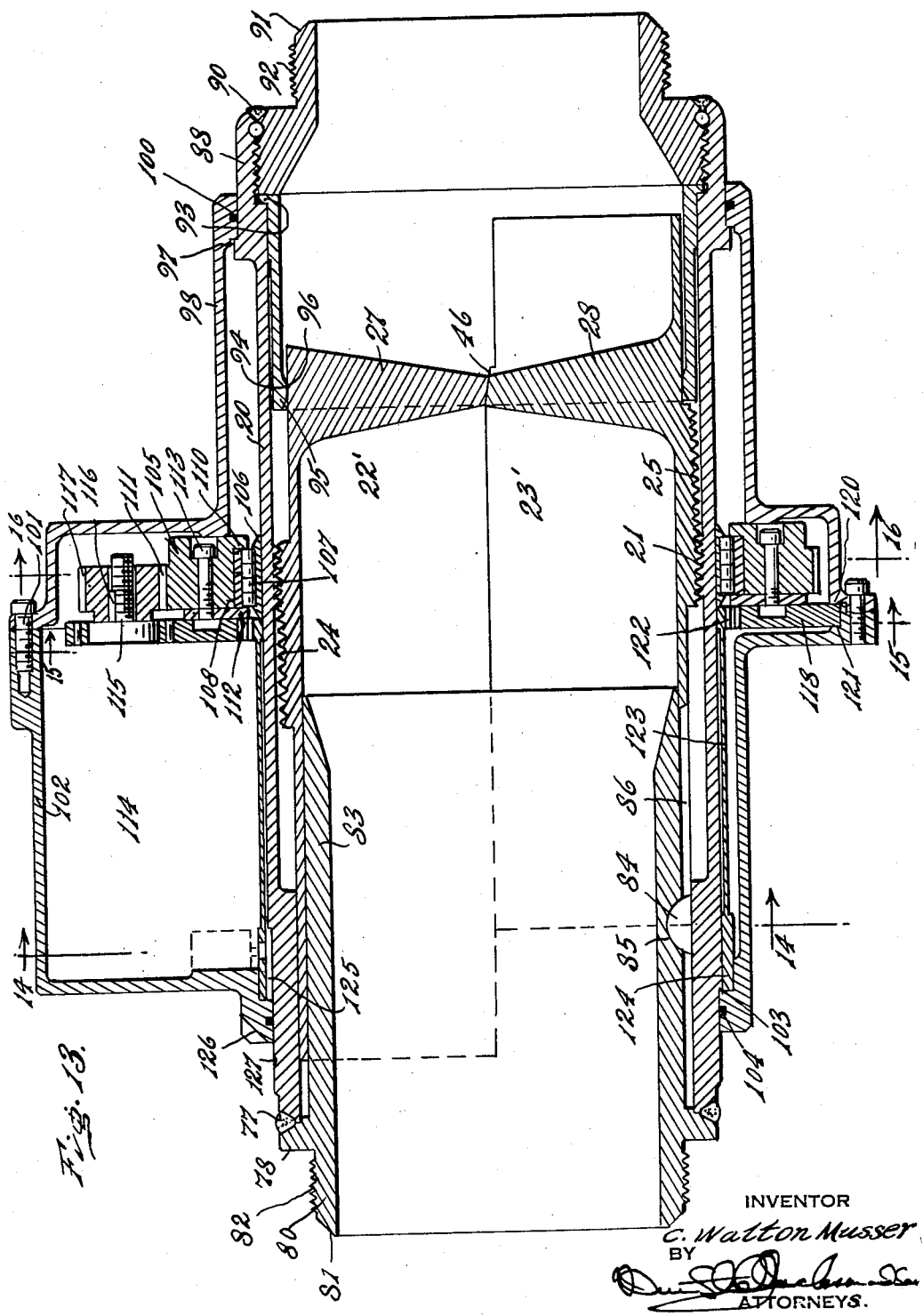

Sept. 27, 1960 C W. MUSSER 2,954,205
STRAIN WAVE AXIAL VALVE
Filed May 31, 1957 8 Sheets-Sheet 5

INVENTOR
C. Walton Musser
BY
ATTORNEYS

Sept. 27, 1960 C W. MUSSER 2,954,205
STRAIN WAVE AXIAL VALVE
Filed May 31, 1957 8 Sheets-Sheet 6

INVENTOR
C. Walton Musser
ATTORNEYS.

Sept. 27, 1960 — C W. MUSSER — 2,954,205
STRAIN WAVE AXIAL VALVE
Filed May 31, 1957 — 8 Sheets-Sheet 7

INVENTOR
C. Walton Musser
ATTORNEYS

Sept. 27, 1960 C W. MUSSER 2,954,205
STRAIN WAVE AXIAL VALVE
Filed May 31, 1957 8 Sheets-Sheet 8

INVENTOR
C. Walton Musser
BY
ATTORNEYS

United States Patent Office 2,954,205
Patented Sept. 27, 1960

2,954,205

STRAIN WAVE AXIAL VALVE

C Walton Musser, Beverly, Mass., assignor to United Shoe Machinery Corporation, Boston, Mass., a corporation of New Jersey Filed May 31, 1957, Ser. No. 662,814

35 Claims. (Cl. 251—134)

The present invention relates to a hermetically sealed valve.

A purpose of the invention is to operate a valve through a hermetically sealed wall with transmission of high operating forces through a wall of appreciable thickness.

A further purpose is to provide valve elements which cooperate to close a valve, the pressure of the system acting on one of the valve elements toward opening and on the other valve element toward closing.

A further purpose is to utilize easily machined shapes such as cylindrical and straight surfaces for a valve of hermetically sealed type.

A further purpose is to utilize a valve in which the pressure of the fluid itself will assist in the sealing action, with increase in sealing pressure as the fluid pressure increases.

A further purpose is to provide readily replaceable valve parts as a complete unit.

A further purpose is to minimize the number of working parts, preferably employing only two moving parts and one stationary part in a hermetically sealed valve.

A further purpose is to utilize resilient sealing surfaces for a hermetically sealed valve.

A further purpose is to distribute the wear by permissible rotation during axial motion of a hermetically sealed valve.

A further purpose is to reduce the size of valve operating members, and to permit hand or power operation as required.

A further purpose is to provide straight line flow in a hermetically sealed valve.

A further purpose is to improve the seal between the flexible valve casing and valve halves by wedge action.

A further purpose is to intermesh a flexible valve casing having threadlike surfaces on one side with a screw having the same pitch of threadlike surfaces, the leads on the threadlike surfaces on the casing and the screw being different, and to deform the casing by engagement with a wave generator acting on the outside of the casing.

A further purpose is to propagate a wave which advances circumferentially of the casing and produces engagement between the threadlike surfaces at a plurality of spaced bearings around the circumference.

A further purpose is to secure freedom from backlash in a valve actuator.

A further purpose is to obtain substantially entirely rolling instead of sliding friction in threaded engagement on the valve operator.

A further purpose is to permit right and left hand thread engagement respectively with the same operating leadless thread.

A further purpose is to make the screw and the valve threads scrammable or completely capable of separating from one another for the purpose of radial movement axially by releasing the wave generator pressure when desired.

A further purpose is to form an element of the wave generator with an interiorly circular contour and an exteriorly elliptoidal shape and deform the exterior surface into a circular contour making the interior elliptoidal.

A further purpose is to guide the hollow semicylindrical valve element having screw surfaces within an annulus.

A further purpose is to mount the semiscrew of the valves against excessive rotation.

A further purpose is to close the valve against a valve seat which is separate from the flexible sleeve or wall.

A further purpose is to indicate the position of the valve by arcuate motion of a component associated with the wave generator.

A further purpose is to move the valve toward closing by a motor and to reduce the torque before the valve goes into closing relation.

Further purposes appear in the specification and in the claims.

The present application is a further development of my application Serial No. 633,254, filed January 9, 1957, for Strain Wave Gearing-Linear Motion and said application is incorporated herein by reference for the purpose of amplifying the explanation of the concept involved.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is an axial section of an embodiment of the valve of the present invention in closed position.

Figure 1a is a fragmentary view corresponding to a portion of Figure 1 and showing a variation.

Figure 2 is a view similar to Figure 1, illustrating the valve elements in open position.

Figure 3 is a section through the wave generator on the line line 3—3 of Figure 1.

Figure 4 is a section at the position of valve closure, on the line 4—4 of Figure 1.

Figures 5 to 7 are views illustrating a modified valve of the invention which employs separate flexible threads from the actual casing or separator wall.

Figure 5 is an axial section of a valve using the separate flexible threads, in closed position.

Figure 6 is a section of Figure 5 on the line 6—6.

Figure 7 is a side elevation showing a portion of the flexible thread member.

Figure 8 is a fragmentary axial section showing a variant form of wave generator utilizing a barrel shape roller bearing element.

Figures 9 and 10 illustrate a variant form of valve employing a wave generator which does not utilize separate roller bearing elements.

Figure 9 is an axial section of the device of Figure 10 on the line 9—9, omitting the valve elements which are similar to those shown in the other forms.

Figure 10 is a section on the line 10—10 of Figure 9.

Figure 11 shows an axial section a variant form of the invention, applied to a plug valve.

Figure 12 is a fragmentary axial section showing a variant form of valve operating in accordance with the present invention, which is scrammable.

Figure 13 is a central axial section of a preferred embodiment of a valve of the invention showing motor operation for remote control purposes.

Figure 14:
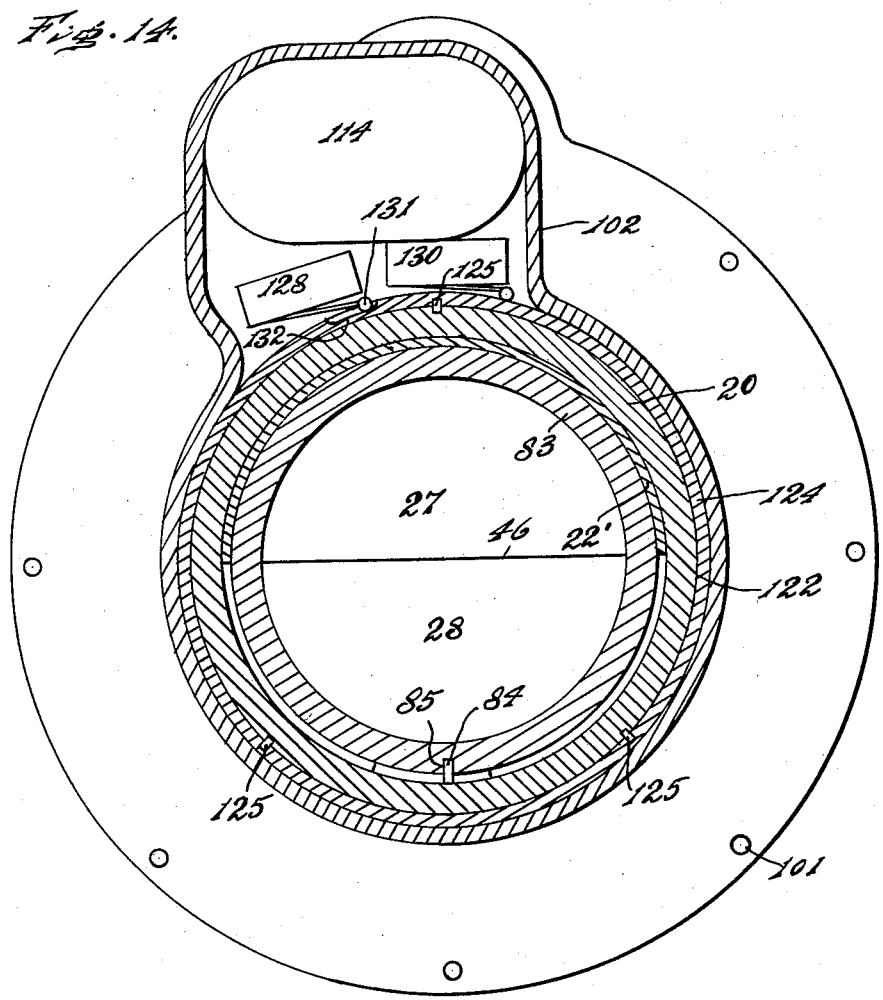
Figure 14 is a section on the line 14—14 of Figure 13.
Figure 15:
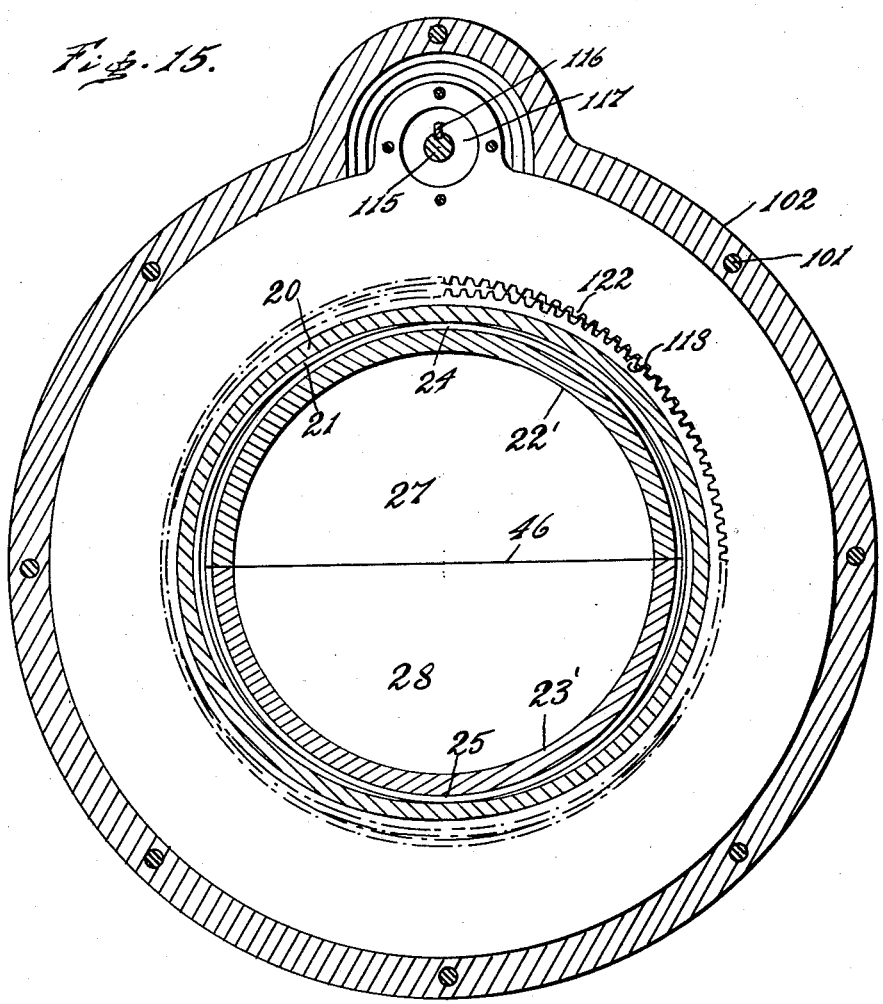
Figure 15 is a section on the line 15—15 of Figure 13.
Figure 16:
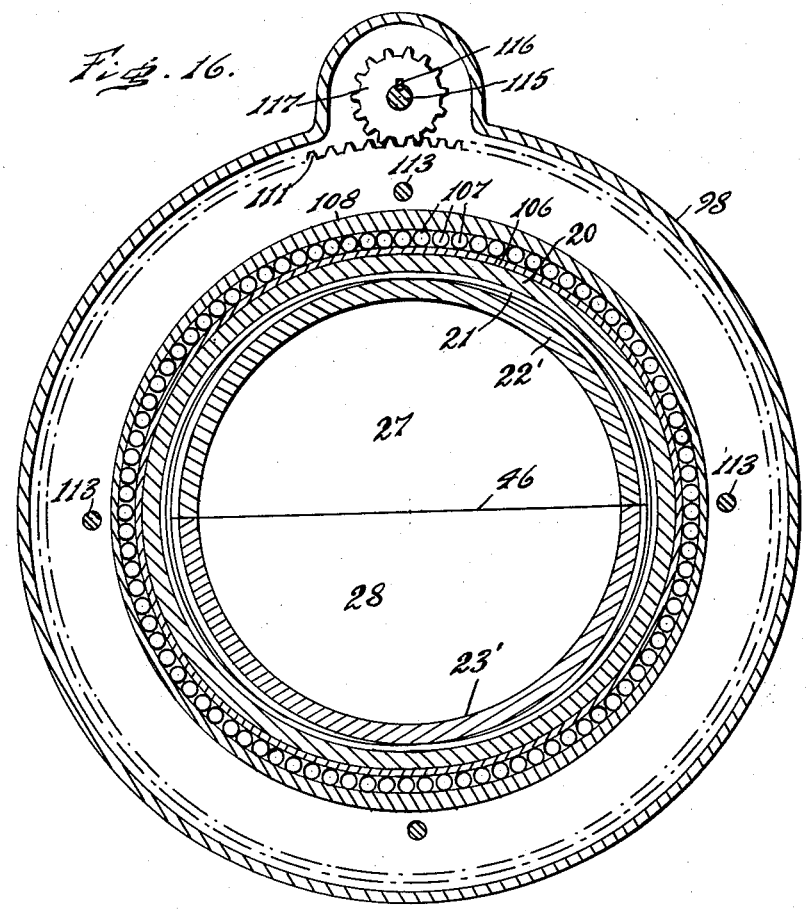
Figure 16 is a section on the line 16—16 of Figure 13.

Efforts have been made in the past to transmit forces through separator walls with avoidance of packings and stuffing boxes but the success encountered has been rather limited. For example diaphragms and bellows have been used, but such structures are relatively fragile.

Most of the methods employed have been open to the difficulty that the force available inside the separator wall has been very limited, and in any case small out of all proportion to the force applied.

The device of the present invention applies very high forces where desired through relatively thick and sturdy separator walls of a hermetically sealed valve. The valve itself which is operated may be a conventional valve of any suitable type, such as a plug valve, sleeve valve, gate valve, or the like, or it may be a special valve of the character particularly disclosed in the present invention. In any case, in accordance with the present invention the valve element is manipulated by linear actuation through a separator wall or casing.

The device of the invention is inexpensive to manufacture and does not require the use of any special small or frail parts. It is also possible in accordance with the present invention to balance the valve operating forces so that such forces do not hinder operation. This is especially true in the preferred form of the present invention, where two valve elements are made from hollow semicylindrical valve elements having screw surfaces. Also, where desired, the separator wall or casing can function as a seat to seal against the hollow semicylindrical valve elements, or in the preferred form the hollow semicylindrical valve elements can seal against the separator seat, suitably with application of a fluid pressure on the seat opposing the pressure of the fluid on the valve elements.

In one form of the present invention, semicylindrical sealing elements engage at a wedge surface which tends to force the semicylindrical surfaces into radial engagement with the seat. Flexibility of the seat, as desirably provided, corrects for any nonuniformity in manufacturing technique, or any deformation caused by manufacturing, ageing, installation or thermal conditions. Where desired, the inclined surfaces can be given a slight hump or curvature to increase the Hertzian stress between the sealed surfaces and obtain a better seal under adverse conditions, including presence of foreign matter.

It will be evident, as later explained, that very simple, cylindrical and flat surfaces can be used for sealing. The sealing action may be self-pressurized with pressure both around the seat and within the valve elements.

All of the valve parts can readily be replaced as a unit.

The operating parts of the valve are reduced to the very minimum, namely two main moving parts and one stationary part.

In the preferred embodiment the seating surface is resilient and readily adapts itself to variations in manufacture, and also distributes wear by allowable rotation.

The valve of the present invention can be of small size, hand or power operated and with straight line flow as desired.

The present invention is applicable at elevated temperature, in the presence of corrosive media, and to chemical reaction mixtures, at elevated pressure, and under other severe operating conditions. The space required within the separator wall or casing for operating parts is reduced to a minimum.

In accordance with the invention, rotary motion is converted into rectilinear motion by inducing a wave to produce a plurality of engagements circumferentially between threadlike surfaces. In the valve of the present invention, the casing or wall is suitably outside, and has flexible threads, and a cooperating screw is inside having mating threads. The external and internal threads have the same thread form. The difference in the number of leads between the flexible tube or flexible thread and the screw is equal to or a multiple of the number of lobes on the wave generator. Cooperating with the screw are threadlike surfaces on the separator wall or casing, which have a different lead from the threads on the screw. In many embodiments the threadlike surfaces on the separator wall or strain thread may constitute simple rings rather than helixes. It will be understood, however, that in some cases it may be preferable to use threadlike surfaces with helix angles on the flexible thread, the important feature being that there is a difference in lead between the threadlike surfaces on the screw and those on the flexible thread.

It will be evident that the valve means may in some cases have leadless ringlike circumferential grooves as in the form of Figure 11 to be described.

In some instances, as later explained, it is preferable to use a left hand thread on one and a right hand thread on the other, but the difference in the number of leads between the two threads will still be equal to or a multiple of the number of lobes on the wave generator. Likewise both the flexible thread and the screw can have left hand threads or both can have righthand threads, as long as the same relation exists between the difference in the number of leads and the number of lobes on the wave generator. For preferred operation the thread form is a function of the pitch of the thread and the deflection of the side wall of the flexible tube with propagation of this deflection around the circumference as the wave generator rotates. Any one of a wide variety of wave generators may be used as later explained.

The threadlike surfaces on the flexible wall or casing may of course be integral with the wall or may be attached or positioned against the wall in any suitable way.

It will be evident that the thickness of the flexible wall will be related to the diameter, and flexible walls of appreciable thickness adequate to withstand substantial pressure differentials may be used where desired. It will further be understood that in order to reduce the pressure differential on the flexible wall, the outside can be placed in a pressurized container maintained at a pressure intermediate between or equal to the pressure around the valve element.

There is considerable need in the art for a hermetically sealed valve which can be operated from outside a casing or separator wall with transmission of high operating force through the wall. This type of valve is needed in the chemical and related industries where the content inside the casing or separator wall is highly injurious to personnel or very important to protect against contact with the atmosphere or against contamination. Similar conditions apply in high pressure steam and high pressure fluids.

Describing in illustration but not in limitation and referring to the drawings:

As illustrated in the form of Figures 1 to 4 inclusive, I have provided a tubular or cylindrical flexible wall 20 which has internal and, in this instance, ring-like threads 21, having any suitable thread form, and in this case integral with the flexible wall. Placed within the interior of the flexible wall or casing 20 are two valve elements 22 and 23, which in the form shown are semi-screws, having external threads 24 and 25 each extending over a half circumference, and each having a thread form which substantially conforms with the thread form on the internal threadlike surfaces 21. Unlike the internal threadlike surfaces 21, the threads 24 and 25, however, have a helix angle and, in the preferred embodiment shown they are desirably opposite, one being lefthand and the other righthand. It is important that there be a difference in lead between the internal threads 21 and the external threads 24 and 25, and the difference, as later explained, must equal the number of lobes on the wave generator, or be a multiple thereof.

In the form illustrated, each of the semi-screws 22 and 23 has an axial extension 26 which connects with a semicylindrical valve closure 27 or 28 which in each case consists of a transverse wall defined in the circumference by a semicircular surface 30, and defined at the axis by a generally longitudinal sealing surface 31 or 32. In the form shown, the surfaces 31 and 32 are desirably cooperating wedge surfaces, at small angles to the axis suitably not exceeding of the order of 10°, so that when, as in Figure 1, the two hollow semicylindrical valve elements having screw surfaces are moved into closed relationship the wedge surfaces will tend to force the hollow semicylindrical valve elements having screw surfaces apart slightly, forcing the semicylindrical closures slightly outward to grip more firmly around the circumferential sealing surfaces 30, and slightly deforming the deformable wall, suitably into an ellipse shape. The hollow semicylindrical valve elements having screw surfaces are desirably longitudinally guided on one another by tongue and groove engagement at 33 in this particular embodiment of the invention.

As shown in Figure 1a, the seal at 30 may be formed with a convex rib as shown at 30', to concentrate the sealing pressure in a limited area and deform the sleeve 20 in sealing.

The interior of the hollow semicylindrical valve elements having screw surfaces may suitably be hollow as shown. Surrounding the flexible wall 20 is a wave generator, which in the form illustrated may be a relatively rigid ring 34 connected to a handwheel or other operator 35 and having an elliptoidal internal bearing race surface 36 (see Figure 3) which in this case suitably positions antifriction rolling elements, here bearing rollers 37 distributed around the race as in a roller bearing and engaging the outside of the flexible wall 20. The separation of the race for assembly is not shown. A suitable lubricant and dust tight seal is provided at 38 on opposite sides of the race, between the generator and the flexible wall.

It will be evident that at any instant the inner and outer threads are in engagement at certain diametrally opposed positions and out of engagement at intermediate positions, and that in such intermediate positions inner and outer threads are relatively advancing with respect to one another. It should be remembered that in this embodiment the threads have the same thread form and pitch, but that the threads on the hollow semicylindrical valve elements having screw surfaces have a double lead so that the lead equals twice the pitch. The fact that the internal threads on the flexible wall are "leadless" makes it possible for them to work into a double lead thread which is in one case righthand and the other case lefthand. Of course, with the same direction of rotation of the wave generator the righthand hollow semicylindrical valve element having screw surfaces will move in an opposite direction from the lefthand hollow semicylindrical valve element having screw surfaces.

As a simple analogy, if two wedges are placed in converging positions and a roller moves between them, one wedge will be deflected in one direction and the other in the other direction and a similar effect occurs on the right and lefthand screw threads due to the helix angle, with the leadless thread functioning like a roller between them.

When the minor axis of the elliptoidal flexible threadlike surfaces on the flexible wall is in line with the juncture between the two hollow semicylindrical valve elements having screw surfaces, the teeth in the flexible wall have the right and lefthand threads on the hollow semicylindrical valve elements having screw surfaces mating at the juncture. As the deflection on the elliptoidal flexible threads on the flexible wall rotate, the minor axis is rotated and the points of almost complete interengagement of the teeth rotate with such deflection on the elliptoidal flexible threads. Thus the teeth on one end of the minor axis are engaged with lefthand threads and the teeth on the other end of the minor axis are engaged with righthand threads on the hollow semicylindrical valve elements having screw surfaces. This causes the hollow semicylindrical valve elements having screw surfaces to move in opposite directions to open or close the valve, depending on the direction of rotation of the wave generator 34. It will of course be understood that the wave generator will, where desired, be restrained against longitudinal motion as by external collars (not shown) engaging the flexible wall at a position remote from the valve.

In operation starting with the valve in open position, as shown in Figure 2, fluid flows in the space between the two valve elements as shown by the arrows 40, and guided as desired by optional streamline surfaces 41, 42, 43 and 44 on the valve elements.

As the wave generator 34 is rotated around the axis of the valve, either by turning the handwheel or by using any suitable rotary drive, the position of the minor axis of the ellipse shifts circumferentially, progressively moving valve element 22 to the left and valve element 23 to the right in Figure 2, desirably sliding over the tongue and groove guide surfaces 33. This closing movement continues and can be stopped at any point to adjust the valve opening. If continued until the wedge surfaces 31 and 32 engage, the valve will be fully closed by engagement of the semicircumferential outer surface of the hollow semicylindrical valve elements having screw surfaces on the interior of the flexible tubular wall as at 45 in Figure 1 and engagement of the wedge surfaces at the center as at 46 in Figure 1. Forcing of the wedge surfaces together after they first come into contact will tend to assure firm sealing, allowing for slight differences in dimensions due to wear or machining error.

To open the valve it is merely necessary to reverse the direction of rotation of the wave generator, in which case the wedge action exerted by the leadless threadlike surfaces on the interior of the flexible tube on the hollow semicylindrical valve element having screw surfaces is reversed and opening action occurs.

It will be evident that in case a larger cross section of opening is desired than that obtainable in the form of Figures 1 to 4, the diameter of the valve can be made suitably larger than the diameter of the connecting pipe as well known.

In many cases it is preferable to manufacture flexible threads which will be separate from and not integral with the flexible tube or casing.

In the form of Figures 5 to 7, I illustrate a flexible tube 20' which is flanged at 47 and recessed at the flange to receive an anchoring flange 48 on a flexible sleeve 50 inside and inseparated relation from the flexible tube 20'. The combination of flanges 47 and 48 are connected to adjoining flanged piping 51 by bolts 52 and suitable gaskets, not shown, although of course welded joints may be used where desired. The sleeve 50 at its outer end has a flexible thread portion 53 provided with internal threadlike ring portions 21 which are suitably leadless as above described, and the flexible gear at its outside engages the interior of the tube 20' so that the thread flexes with the tube wall. To increase the flexibility of the gear and avoid distortion of the sleeve 50 it is suitably longitudinally slotted at 54 between the flexible thread portion and the flange 48.

The hollow semicyclindrical valve elements having screw surfaces 22 and 23 are desirably constructed as previously described except that they externally seal at 45 on the suitably flexible portion of the sleeve 50, rather than on the casing. A different form of guiding between the hollow semicylindrical valve elements having screw surfaces is here provided, since the hollow semicylindrical valve elements having screw surfaces have internal semicylindrical walls 55 and 56 which engage the external cylindrical wall 57 of guiding sleeve 58, the guiding sleeve being desirably secured as by pinning at 60 to the hollow semicylindrical valve element having screw surfaces 22 and sliding along the interior of the hollow semicylindrical valve element having screw surfaces 23.

In operation this device is similar to that already described.

In some cases it is preferable to deform the flexible wall inwardly into an annular ring. This is shown in Figure 8 where the wave generator 34' receives a series of barrel-like rollers 37' in a concave race 36' to produce a ring-like deformation 61 which deforms the flexible gear slightly more pronouncedly at a center position than at the edges of the minor axis of the ellipse. This is greatly exaggerated in Figure 8. The wave generator suitably separates into segments for assembly.

In some cases, as in Figures 9 and 10, the flexible gear 21' is directly engaged by an elliptoidal wave generator $34^2$, omitting the use of bearing rollers. In this case the wave generator is also slightly convex in longitudinal section as shown at 62 and the flexible gear is slightly concave as shown at 63. Otherwise the structure is similar. The wave generator here is assembled from segments $34^3$ and $34^4$, bolted to the handwheel at $34^5$.

The principles of the invention can be applied to a valve of any desired character, and it is not important in the present invention in its broadest aspect whether the valve be a plug valve, gate valve, sleeve valve or some other type.

Figure 11 illustrates a construction having a flexible wall or casing $20^2$ with suitably ring-like thread surfaces 21 on the inside at one point, which cooperates with external thread surfaces 24', which in this case extend all the way around a cylindrical hollow screw 64 extending longitudinally of the valve and connected by a spider 65 having suitable ports 66 with a plug valve 67 which in closed position engages in a plug valve seat 68. The casing is provided with suitable flanges 70 and 71 which may be secured to connecting piping as by bolting, welding or otherwise.

In the form of Figure 11, multiple lead threads are provided on the outside of screw 64 to cooperate with the circumferential internal threadlike grooves at 21 on the inside of the flexible tube or casing. The wave generator 72 has an internal race 73 of elliptoidal shape in section transverse to the axis, which is provided with suitably barrel type roller bearings 74, which engage in an external race 75 on the outside of the flexible tube $20^2$ around the thread grooves 21. The wave generator is here shown as turned by handwheel 76.

The wave generator is axially fixed and has two or more lobes of pressure engagement as already explained and as shown for example in Figure 3. When the wave generator is rotated the deflection will rotate around the circumference producing a deformation akin to a wave which makes the threadlike grooves on the flexible tube move radially into and out of engagement with the threads of the screw.

In assembling the device it will be understood that if the threadlike surfaces clear from one another in unstrained condition, the screw and the flexible tube can simply move axially to one another and then the wave generator can be assembled around the outside, as by uniting segments or forming to compress the wave generator on the outside. If the threadlike surfaces interlock in unstrained condition, the wave generator may have to be rotated in order to assemble or disassemble the parts.

Figure 12 shows the condition of the teeth of the unstrained flexible tube 20 and the screw $24^2$ in order that the device may move in response to fluid pressure (scrammable), that is, that the wave generating deformation can be relieved as by separating halves or segments of the wave generator. Under these conditions the screw can move axially without being retained by the teeth on the flexible tube, as for example to suddenly permit the valve to move under the fluid pressure in an emergency.

It will of course be evident that the material used for the components may be any suitable material such as steel, stainless steel, bronze, titanium alloy or other structural material, or an elastomer such as rubber, synthetic rubber, nylon or the like. It is important in the present invention that the lead between the threadlike grooves on the flexible tube and the lead on the screw should differ by the number of contact points or lobes on the wave generator or a multiple thereof. Thus where there are two lobes the lead should differ by two or a multiple thereof and when there are three lobes the lead should differ by three or a multiple thereof.

Frequently the flexible tube is provided with no lead and the screw has double lead of the same pitch and thread shape. The lead on the screw can be righthand or lefthand as desired.

Various contours can be used, although a sharp V thread is satisfactory for many purposes.

The progression of tooth contact from one point to another can be likened to the pivot of a track laying vehicle or the motion of a caterpillar. The track, which is analogous to the flexible tube is in stationary contact with the earth, which is analogous to the screw, and is rolling forward by laying down a new section of track. This is similar to the motion occurring in the device of the present invention. The motion in the present invention is almost pure rolling.

The fundamental theory is set forth in considerable detail in my application referred to.

It will be evident that the invention can be embodied in a wide variety of forms either with antifriction wave generators or without.

In some cases it is desirable to deliberately overdeform the internal threads by shaping the wave generator to prestress the threads at the location of the lobes, thus compensating for slight differences in machining. This feature will desirably be incorporated in the forms of the present invention.

In many cases it is desirable to employ the valve of the invention for remote control or motorized operation, and the principles of the invention are applied to a valve of this character in Figures 13 to 17 inclusive.

In this form the valve has opposed hollow semicylindrical valve elements having screw surfaces 22' and 23' which have external respectively righthand and lefthand threads 24 and 25, closure portions 27 and 28 and a wedge engagement having sealing at the center at 46 as previously described.

A flexible wall, sleeve or casing 20 surrounds the hollow semicylindrical valve elements having screw surfaces and has internal threadlike ring surfaces 21 as previously described, which mate with the threads 24 and 25 at two diametrally spaced positions with intermediate non-mating positions.

In the form shown, the sleeve 20 at one end connects by a weld 77 with a flange 78 on the outside of an extension 80 which is intended to weld at 81 to connect to piping, and is provided with external threads 82 for test purposes. The extension 80 has an internal circular guiding sleeve 83 which is in spaced relation from the inside of the sleeve 20 to provide longitudinal guiding for the ends of the hollow semicylindrical valve elements having screw surfaces remote from the closure walls 27 and 28. A suitable key such as Woodruff key 84 in a key socket 85 extends outwardly into a longitudinal slot 86 in valve element 23', the slot being of sufficient width to allow adequate rotation of the valve elements while restraining them against excessive rotation as desired. The slot 86 is covered by the guide portion 83 on the inside.

At the opposite end of the valve, the sleeve 20 connects with a separate sleeve extension 88, which after assembly is welded to the sleeve at 90 and welded to connected piping at 91, and which carries an external thread 92 for test purposes.

The extension 88 abuts against and holds in place the annular flange 93 of an annular seat 94 which suitably has at its sealing surface an internal ringlike portion 95 of internally convex shape, which, when the valve elements are closed and the wedge action at 46 forces the semi-cylindrical surfaces apart, provides a tight seal for the valve at 96.

The sleeve 20 carries near one end an exterior rim 97 over which engages one end of a housing portion 98 which surrounds and is free to turn on the sleeve and has a dirt seal 100. The housing portion 98 connects by bolts 101 with an opposing housing portion 102 which at the opposite end engages against a shoulder on the outside of the sleeve at 103 and has a dirt seal 104.

The housing formed by the elements 98 and 102 has a wave generator ring portion 105 which receives a wave generator inner race 106, a series of bearing rollers 107 and a wave generator outer race 108, the outer race and bearing elements being held together between a retainer ring portion 110 on wave generator ring gear 111, and an opposing retainer ring 112 which is bolted at 113 to the ring gear on the side remote from the outer race.

A space located at one portion around the circumference inside the housing portion 102 receives a motor 114 which has internal gear reduction as well known and has an output shaft 115 which has keyed thereon at 116 a pinion 117 which meshes with the teeth on the outside of the wave generator ring gear 111.

An internal ring gear 118 is bolted to the motor 114 and operates in the space between the two portions of the housing guided by opposing walls 120 and 121 except where the motor is located. The internal teeth of the gear 118 cooperate at diametrally spaced points with intermediate non-mating points on flex gear 122 which is positioned by flexible wall 123 remote from hub portion 124 which is keyed at 125 to the outside of valve sleeve 20.

The mechanical operation of the device of Figures 13 to 16 will be understood from the following description.

It will be evident that the valve is opened and closed by motion of the two valve segments parallel to the axis of flow so that the benefit of balancing is obtained since one segment is always moving in the direction of flow while the other segment always moves opposite to flow. The valve is hermetically sealed and no packing or stuffing box is required.

The materials for the valve with exception of the exterior housing and gear will preferably be stainless steel or similar corrosion resisting material.

As the hollow semicylindrical valve elements having screw surfaces approach in closing, as later explained, the closing torque capability is reduced preferably to approximately 20 percent of the maximum motor torque. Then when the predetermined torque of the valve is reached on closing, a current limiting relay disconnects the motor. Limit switches suitably accomplish the control as later explained.

The device of the invention desirably incorporates an indicating action, as by the relation of an indicator index 126 on the housing with respect to indicator marks 127 on the sleeve (only one of which is shown). The graduations can be plainly visible adjacent the motor housing and the entire motor and gear housing turns suitably about 30 degrees in relation to the valve in accomplishing indication. This provides a very sturdy indicating system which is not likely to be misread. It will be evident, of course, that any desired pointer can be employed of suitable length as desired.

Each of the hollow semicylindrical valve elements having screw surfaces is in the shape of half of a cup and their opposite threads on the circumference cooperating with the flex threads on the inside of the sleeve or valve wall 20 accomplish opening and closing motion as already explained. The valve wall in the general region of the threads is deflected into an elliptoidal configuration. This deflection brings the circumferential grooves on the inside of the valve wall into contact with the threads on the valve segments on the minor axis of the elliptoid.

The extent of elliptoidality is great enough to cause the threads to be fully disengaged for clearance from each other at the major axis. The lead difference between the threads on the outside and the threads on the inside is equal to the number of contact points as already explained, in this case two.

Since the threads on the valve wall do not have any lead and are really circumferential grooves of thread form, the lead on the valve hollow semicylindrical valve element having screw surfaces is equal to twice the circular pitch. Under these conditions, where the shape of the elliptoid is rotated so as to cause the minor axis to rotate around the valve wall, each hollow semicylindrical valve element having screw surfaces will move a distance of twice the circular pitch for each revolution of the elliptoid. Since one valve hollow semicylindrical valve element having screw surfaces has righthand threads and the other lefthand threads, one of the hollow semicylindrical valve elements having screw surfaces will move to the right and the other to the left.

The outer race 108 of the wave generator is made with varying thickness around the circumference. As made its inner surface is circular and its outer surface has the desired degree of elliptoidality. As a consequence, the bearing consisting of the inner race 106, the rollers 107 and the outer race 108 not only functions as the device to initially deflect the valve wall 20 to the elliptoidal shape, but due to the rollers, it rotates the elliptoidal shape around the valve wall 20. As the bearing is initially assembled and placed on the valve wall it is of round internal configuration. It is then deflected by any suitable clamp until the exterior surface of the outer race 108 is circular and then slipped into the circular inner surface of the wave generator ring gear 111. This retains the inner portion of the wave generator elliptoidal since there is little clearance in the bearing and since the ring gear is relatively rigid.

The retainer ring 112 holds the wave generator elements in the elliptoidal shape.

The elliptoidality is essentially two sine waves superimposed on a circle. The cross over point of these two sine waves to the circle occurs at the four points where the coordinate axes intersect the circle. This configuration produces the least stress for a given deflection of the valve wall. The rotation of the wave generator produces a travelling wave in the valve wall. The two hollow semicylindrical valve elements having screw surfaces are retained in place by the inner guide 83 and prevented from substantial rotation by the Woodruff key which cooperates with the slot 86, the slot being wide enough to accommodate the normal slight rotation which occurs during valve opening and closing.

In closed position, the hollow semicylindrical valve elements having screw surfaces seal against the valve seat at 96, being aided by the wedge action 46 at the center. The slightly convexed ring portion on the inside of the seat provides relief at all other portions of the valve element travel to prevent excessive wear to the valve seat. The clearance with respect to the valve seat as well as the clearance of the other end of the segments with the annular guiding groove will suitably be of the order of 0.005 inch to exclude sizable foreign material from entering into the crevices.

The valve seat can be replaced if necessary. The fact that the valve seat is separate also prevents the possibility that it may deflect when the wave generator rotates. The clearance between the outside of the valve seat and the inside of the valve wall permits the pressure of the contained fluid to contract the valve seat as the pressure is increased. Hence, if the high pressure side of the pipe line is to the left in Figure 13, and the low pressure side is to the right, when the valve is closed against a low or moderate pressure, an increase in this pressure will tend to increase the sealing pressure on the valve.

The wave generator is driven by the motor and its internal gear train to reduce the speed of pinion 117 to the desired level. The motor is capable of driving in either direction. The operation of the motor turns the wave generator ring gear 111 and opens and closes the hollow semicylindrical valve elements having screw surfaces.

The motor is fastened also to indicator ring gear 118 which is free to turn. The indicator ring gear at suitably two spaced points is engaged by the teeth of indicator flex gear 122 and the indicator flex gear is deflected into elliptoidal shape as already explained by its engagement with the outside of the valve wall. The indicator flex gear itself cannot turn because it is keyed to the outside of the valve wall. According to the principles of harmonic gearing and strain wave gearing as already explained, the indicator ring gear therefore is turned and it turns with it the motor and since the motor is at the outside secured to the housing, the housing is also turned suitably of the order of 30 degrees when the hollow semicylindrical valve elements having screw surfaces move from fully open to fully closed position. This condition changes the relation of the index 126 to the markings 127 as already explained. The motor housing has mounted within it at circumferentially spaced positions, two limit switches, suitably microswitches 128 and 130 having roller feelers 131 which ride on the outside of the hub portion of the flex gear 122 and at suitably circumferential points engage in a recess 132. One of these limit switches stops the motor as it approaches open position and the other one suitably throws in a series resistance to limit the torque capabilities of the motor as it approaches closed position, the entire electrical equipment as shown in Figure 17 being suitably contained within the motor housing of Figure 13.

The initial assembly of the valve is accomplished through the righthand end prior to the completion of the weld at 90. With the extension 88 and the valve seat 94 removed, the hollow semicylindrical valve element having screw surfaces 23' is placed in the position shown and then the wave generator is rotated until the hollow semicylindrical valve element having screw surfaces 23' has moved the entire way to the left and is seated at the bottom of the annular groove between the guide 83 and the valve wall 20. The hollow semicylindrical valve element having screw surfaces 22' is then inserted until it comes into contact with the circumferential grooves of the valve wall 20 and the wave generator is then rotated in the opposite direction until the hollow semicylindrical valve elements having screw surfaces are in the closed position shown. A valve seat is then inserted and the extension 88 is drawn tightly into place and the seal weld 90 is made.

The motor housing and gear housing are then placed in relation to the indicator flex gear 122 so that the indicator will read fully closed. The motor housing may be required to move a tooth or two in relation to the flex gear to give a proper reading. Any suitable access opening to the housing is provided for electric wiring (not shown).

Figure 17:
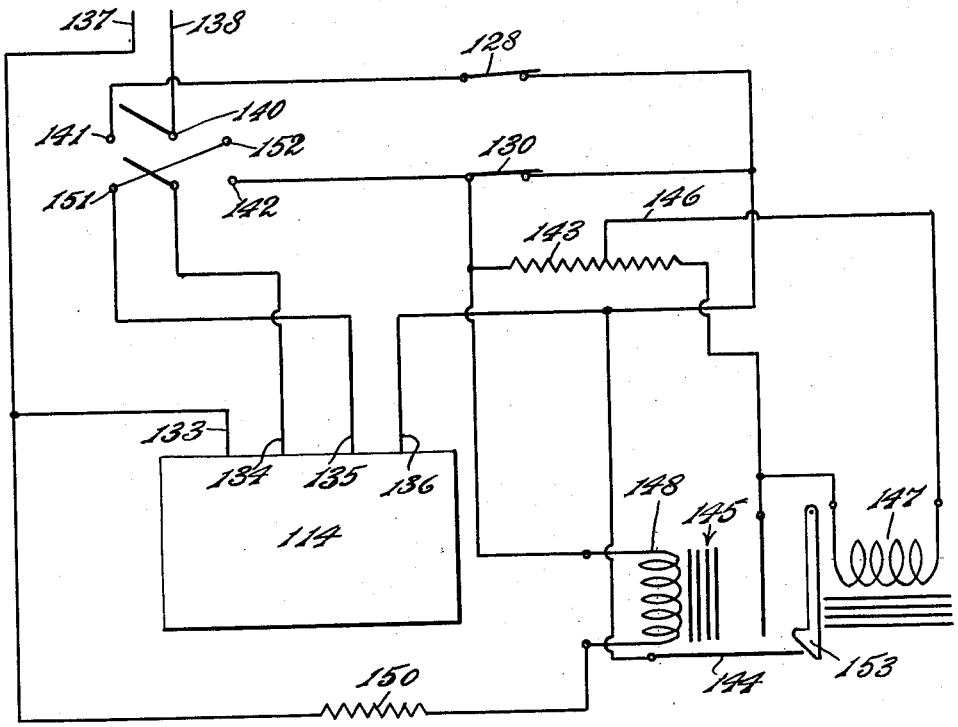
Figure 17 is a wiring diagram for the valve of Figure 13.

Considering now the electrical diagram of Figure 17 more in detail, the motor 114 has field connections 133 and 134 and armature connections 135 and 136. A suitable source of commercial alternating current such as 110 volts at 60 cycles is connected to inlet leads 137 and 138, one of which is connected to field terminal 133 and the other of which is connected to one of the midconnections of double pole, double throw switch 140 having a central off position. The other midconnection of the switch 140 is connected to field terminal 134.

One of the lefthand contacts 141 of switch 140 is connected through normally closed limit switch 128 to one branch which extends to armature terminal 136, to another branch which extends through normally closed limit switch 130 to opposite terminal 142 of switch 140, and also through the limit switch 130 through the torque cut-down resistor 143 which is connected through relay contacts 144 of relay 145 to armature terminal 136 and also from resistor tap 146 through relay winding 147 to one of the relay contacts 144. There is also a connection from limit switch 130 on the side adjoining the resistor 143 through relay winding 148 of relay 145 and through optional current limiting resistor 150 to field terminal 133 of the motor.

Armature terminal 135 of the motor is connected to reversing contacts 151 and 152 of switch 140.

Limit switch 128 is a normally closed microswitch suitably roller lever operated, and limit switch 130 is a normally closed microswitch of similar character.

Resistor 143 is adequate to reduce the motor torque to about 20 percent. The resistor is tapped at a position which will produce a suitable operating voltage such as 18 volts for relay coil 147 when the motor develops 20 percent of normal torque.

The motor is a series wound universal motor which will operate in either direction. The relay combination 145 is suitably a latching relay having a latch 153, the armature of which is actuated during the opening operation and latched into contact closed position to place the resistor 143 parallel with the limit switch 130. The relay coil 147 operates its armature so as to unlatch the armature of relay 145 as well known. This unlatching occurs when the voltage drop across the portion of the resistor to which the coil 147 is in parallel is large enough to actuate the relay.

The valve can be opened and closed, stopping at any position between the open and closed positions. When the valve opens, the final open position is not critical and is determined by the limit switch operating on opening. In the closing position, however, due to variation in temperature and pressure, before the valve closes the series resistance is placed into line by limit switch 130. This reduces the torque capabilities of the motor so that the valve can run home until the closing torque reaches a predetermined level at which point a relay coil 147 of the relay is placed in parallel with a portion of the current limiting resistance. As the torque on the motor is increased the motor slows down and the voltage in resistance 143 increases until there is sufficient voltage drop in the relay coil 147 to unlatch the relay 145 and disconnect the relay contacts 144 and stop the motor.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a valve, a valve means having external threadlike surfaces, a flexible tube around the valve means adapted to deflect and having interior threadlike surfaces concentric with and cooperating with said external threadlike surfaces on the valve means, the thread forms of the threadlike surfaces on the tube and on the valve means being the same, but the respective threadlike surfaces having a difference in lead, and a wave generator surrounding the flexible tube and operative to deflect the flexible tube and maintaining the flexible tube deflected into mating engagement between the threadlike surfaces on the inside of the flexible tube and the threadlike surfaces on the outside of the valve means at a plurality of circumferentially spaced lobe positions interspaced by nonmating positions, the difference in lead being equal to or a multiple of the number of lobes, the wave generator being shiftable around the periphery of the flexible tube and thereby propagating a wave around the periphery of the flexible tube and causing relative movement of the valve means with respect to the flexible tube.

2. A valve of claim 1, in which one of the threadlike surfaces has multiple lead threads.

3. A valve of claim 2, in which the multiple lead threads are provided on the valve means.

4. A valve of claim 2, in which the interior threadlike surfaces on the flexible tube are leadless ring-like circumferential grooves.

5. A valve of claim 1, in which the valve means has thereon threadlike surfaces which are leadless ring-like circumferential grooves.

6. A valve of claim 1, in which multiple lead threads are provided on the flexible tube.

7. A valve of claim 1, in which the respective internal and external threadlike surfaces are of opposite hand, one righthand and one lefthand.

8. A valve of claim 1, in which the wave generator deflection can be removed and the parts cleared, in that in relaxed position the threadlike surfaces radially clear from one another.

9. A valve of claim 1, in which the wave generator deflection can be removed and the parts do not clear, in that in relaxed position the respective threadlike surfaces do not radially clear from one another.

10. A valve of claim 1, having two generally diametrally opposed thread mating positions.

11. A valve of claim 1, in which the wave generator comprises a surface of rotation engaging the flexible tube at spaced points, which create spaced deflection, said surface of the wave generator directly engaging the flexible tube.

12. A valve of claim 1, in which the wave generator comprises a raceway adjoining the outside of the flexible tube, and means including bearing elements travelling in the raceway for propagating a wave in the flexible tube.

13. A valve of claim 1, in which the threads are spring preloaded in engagement by the wave generator, thereby compensating for variations in thread dimensions.

14. A valve of claim 1, in which the valve means comprises opposed valve elements cooperating in closed position, there being threads of opposed hand, respectively right and left hand, on the opposed valve elements.

15. A valve of claim 1, in which the valve means comprises hollow semicylindrical valve elements having screw surfaces which in closed position cooperate to close the interior space, the valve elements having threadlike surfaces of opposite hand, one left hand and one right hand.

16. A valve of claim 1, in which the valve means comprises two hollow semicylindrical valve elements having screw surfaces, having flat mating surfaces and having end closures which in one position close the interior space and having threadlike surfaces on their semicylindrical contours which are of opposite hand, and which externally engage the interior of the tube, the closed portions of the valve elements externally engaging and sealing against the interior of the flexible tube at a position axially removed from the threadlike surfaces.

17. In a valve, a flexible tube having threadlike internal surfaces, valve means within the tube having cooperating threadlike external surfaces, means for deflecting the threadlike surfaces on the tube into engagement with the threadlike surfaces on the valve means at a plurality of circumferentially spaced points with intermediate nonmating points and means for propagating a wave around the flexible tube and advancing the mating points, there being a relative difference in helix angle between the respective threadlike surfaces.

18. In a valve, a flexible tube having threadlike interior ring surfaces, hollow semicylindrical valve elements having screw surfaces filling the interior of the space within the flexible tube, having generally straight mating surfaces and having threadlike surfaces of opposite hand engaging threadlike surfaces on the flexible tube, the valve elements having axially removed from the threadlike surfaces thereon closed surfaces which in one position internally mate with one another and externally seal with the interior of the flexible tube, and means for generating a circumferential wave of engagement between the threadlike surfaces on the interior of the flexible tube and the threadlike surfaces on the outside of the valve elements, the wave of engagement including intermediate nonmating positions of the threadlike surfaces.

19. In a valve, a flexible valve casing having a cylindrical internal wall, annular leadless threadlike surfaces on the interior of the casing at a particular location, semicylindrical valve halves occupying the space inside the casing and including cooperating closure portions, which in a mating position seal against one another and seal against the cylindrical interior of the casing, exterior threadlike surfaces on the outside of the semicylindrical valve portions engaging the interior threads on the casing, the threadlike surfaces on the valve halves having opposite pitch, and a wave generator surrounding and engaging the casing, deflecting the casing into mating engagement of the internal threadlike surfaces on the casing with the external threadlike surfaces on the valve halves at a plurality of circumferentially spaced points with intervening nonmating points.

20. A valve of claim 19, in combination with a guideway maintaining the valve halves in alignment.

21. A valve of claim 20, in which the guideway comprises tongue and groove surfaces of engagement between the valve halves.

22. A valve of claim 19, in which the guideway comprises a tubular member inside the valve halves.

23. A valve of claim 19, in which the guideway comprises a tubular member inside the valve halves and secured to the valve casing.

24. A valve of claim 23, in which interlock means connect the guideway to one of the valve halves.

25. A valve of claim 19, having wedge surfaces between the valve halves, the valve halves being forced into sealing engagement externally with the interior of the casing to effect a seal between the valve halves and the casing.

26. A valve of claim 25, having a separate seat around the valve halves cooperating with the same in closed position.

27. In a valve, valve means having a double lead external thread, a flexible casing surrounding the valve means having internal leadless threadlike surfaces and a wave generator deflecting the flexible casing to bring its internal threadlike surfaces into engagement with the exterior thread on the valve means at a plurality of spaced points with intermediate nomating points.

28. In a valve, a valve casing having flexible internal threadlike surfaces, a plurality of hollow semicylindrical valve elements having external threadlike surfaces cooperating with the internal threadlike surfaces, the valve elements having mating wedge surfaces in closed position and an external sealing rim which in one position seals with the casing, a wave generator deflecting the internal threadlike surfaces into mating engagement at a plurality of circumferentially spaced points with the external threadlike surfaces on the valve elements with intermediate nonmating positions, whereby in closed position of the valve the wedge surfaces force the circumferential sealing rim on the hollow semicylindrical valve elements outward into engagement with a portion of the casing.

29. In a valve, a flexible valve casing having internal flexible threadlike surfaces, hollow semicylindrical valve means within the casing inside the internal threadlike surfaces, said valve means having respectively left and righthand threads, and a wave generator deflecting the internal threadlike surfaces into engagement with the respective left and righthand threads on the valve means at a plurality of spaced points with intermediate nonmating points.

30. A valve of claim 29, in combination with indicating means visible at the outside of the valve showing the valve position.

31. In a valve, a flexible valve casing having internal flexible threadlike surfaces, valve means within the casing having external thread-like surfaces engaging the thread-like surfaces on the valve casing at a plurality of circumferentially spaced points with intermediate non-mating points, a wave generator deflecting the internal threadlike surfaces into engagement with the thread-like surfaces on the valve means, and index means visible on the outside of the valve indicating the relative position of the valve means.

32. A valve of claim 31, in which the index means comprises a flex gear responsive to the deflection of the valve casing, an indicator ring gear engaging the flex gear at a plurality of circumferentially spaced points with intermediate non-mating points and an indicator carried by the indicator ring gear and turning therewith.

33. In a valve, a flexible valve casing having internal flexible threadlike surfaces, valve means within the casing having threads which are engaged by the internal threadlike surfaces at a plurality of spaced points with intermediate non-mating points, a wave generator deflecting the internal threadlike surfaces into engagement on the valve means at a plurality of spaced points with intermediate non-mating points, an electric drive motor turning the wave generator, switch means responsive to the position of the valve means for connecting resistance in series with the motor to reduce the torque capability of the motor as the valve approaches closing, and torque responsive means for cutting off the motor when the valve closes.

34. The method of assembling a valve, which comprises placing a valve element having external threads inside a flexible valve casing having internal threads capable of mating at a plurality of spaced points with intermediate non-mating points, placing around the casing a bearing having an inner race, bearing elements and an outer race which is interiorly circular and exteriorly elliptoidal, deforming the outer race until it is exteriorly circular and internally elliptoidal and holding the outer race within the circular interior of the wave generator.

35. A valve of claim 1, in which the valve means consists of two relatively movable members and said relatively movable members have thread-like surfaces of opposite hand, one right hand and one left hand.

References Cited in the file of this patent

UNITED STATES PATENTS

| | | |
|---|---|---|
| 1,418,592 | McGee | June 6, 1922 |
| 1,420,663 | Maxwell | June 27, 1922 |
| 1,529,005 | Beckwith | Mar. 10, 1925 |
| 1,943,854 | Beckwith | Jan. 16, 1934 |
| 2,533,491 | McMahon | Dec. 12, 1950 |
| 2,536,813 | Jones | Jan. 2, 1951 |

FOREIGN PATENTS

| | | |
|---|---|---|
| 536,659 | Great Britain | of 1941 |